United States Patent
Yamaguchi et al.

(10) Patent No.: US 6,332,995 B1
(45) Date of Patent: Dec. 25, 2001

(54) WIRING METHOD FOR A RESIN MOLD PRODUCT

(75) Inventors: Atsuyoshi Yamaguchi; Mitsuaki Morimoto, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/330,083

(22) Filed: Jun. 11, 1999

Related U.S. Application Data

(62) Division of application No. 08/995,558, filed on Dec. 22, 1997, now Pat. No. 6,033,745.

(30) Foreign Application Priority Data

Dec. 27, 1996 (JP) ............................................. 8-351490

(51) Int. Cl.[7] ................................................. B29C 65/02
(52) U.S. Cl. ....................... 264/249; 264/271.1; 264/443; 156/73.1
(58) Field of Search .................................. 264/248, 249, 264/267, 271.1, 442, 443, 445; 156/73.1, 580.2

(56) References Cited

U.S. PATENT DOCUMENTS

| | | | |
|---|---|---|---|
| 4,193,181 | * | 3/1980 | Boulanger et al. .................... 29/509 |
| 4,473,715 | * | 9/1984 | Beinhaur et al. ....................... 174/87 |
| 4,867,597 | * | 9/1989 | Denlinger et al. .................... 403/285 |
| 4,875,582 | * | 10/1989 | Finney et al. ......................... 206/330 |
| 5,607,528 | * | 3/1997 | Choudhury .......................... 156/73.2 |
| 5,639,522 | | 6/1997 | Maki et al. . |
| 5,705,104 | * | 1/1998 | Trublowski et al. ................ 264/1.25 |
| 5,709,407 | | 1/1998 | Stephens et al. . |
| 5,798,012 | * | 8/1998 | Krane et al. ............................ 156/71 |

FOREIGN PATENT DOCUMENTS

| | | |
|---|---|---|
| 8-37719 | 2/1996 | (JP) . |
| 8-45570 | 2/1996 | (JP) . |

* cited by examiner

*Primary Examiner*—Jan H. Silbaugh
*Assistant Examiner*—Stefan Staicovici
(74) *Attorney, Agent, or Firm*—Armstrong, Westerman, Hattori, McLeland & Naughton, LLP

(57) ABSTRACT

A resin mold product and a wiring method are provided. This resin mold product includes a main body formed into a pillar trim, side walls which are situated higher than wires, and wire receiving portions formed between the side walls. According to the wiring method: the wires, which have been cut to a suitable length for the front pillar, are received by the wire receiving portions; the side walls are partially melted so as to weld and secure the wires to the resin mold product; the resin mold product is mounted to the front pillar; and circuits mounted on the instrument panel and the roof are connected to each other.

4 Claims, 10 Drawing Sheets

WIRING METHOD FOR A RESIN MOLD PRODUCT

This application is a division of prior, application Ser. No. 08/995,558 filed Dec. 22, 1997 now U.S. Pat. No. 6,033,745, filed on Mar. 7, 2000.

BACKGROUND OF THE INVENTION

1. Field of the Invention

The present invention relates to a wiring method for a resin mold product such as a pillar trim for vehicles, and more particularly to a resin mold product and a wiring method by which wires of various kinds can be easily arranged and workability can be enhanced by the automation of wiring.

2. Related Art

Since many electric devices of various kinds are mounted to a vehicle internally and externally, hundreds or thousands of wires are arranged to the vehicle regardless of whether it is a popularly-priced car or a luxury car.

In the prior art, a circuit mounted to an instrument panel and a circuit mounted to a roof are connected by a series of long wires (a wire harness) which extend from the instrument to the roof via the inside of a pillar trim (a resin mold product) mounted to the front pillar.

However, such pillar trim is long and narrow, and because of this, it has been difficult to fit long wires inside the pillar trim. For this reason, the wiring from the instrument panel to the roof cannot be performed efficiently, making it a time-consuming troublesome procedure.

Japanese Patent Application Laid-Open Nos. 8-37991 and 8-45570 each discloses an electric connector box as shown in FIGS. 11A and 11B.

In those figures, reference numeral 101 indicates a case (a resin mold product) that constitutes the electric connector box having wire grooves 101a. Wires 102 are received by the wire grooves 101a and secured to the wire grooves 101a by solderless terminals 103.

With this structure, the wires 102 are attached to the case 101 that is the resin mold product, so that the wires 102 can be efficiently arranged in the wire grooves 101a of the electric connector box with the help of the solderless terminals 103.

According to the above conventional wiring method, however, the wires 102 cannot be secured at positions where there is no need to connect the solderless terminals 103, because the wires 102 are secured firmly only where the solderless terminals 103 are connected.

On the other hand, since wires attached to a front pillar are lengthy, they need to be secured at least at both ends and at the mid section. Since no solderless terminal 103 is required at the mid section of the wires, there has been a problem that they cannot be secured at the mid section.

The solderless terminals 103 can secure the discrete wires 102 into the wire grooves 101a, but a flat wire harness consisting of a plurality of conductors covered with an insulating coating cannot be secured. This sets a limit to types of wires that can be employed.

Since the coating of a flat wire harness is generally made of PET (polyethylene telephthalate), it is difficult to secure the flat wire harness by using an adhesive to the wire grooves 101a of the case 101 that is a resin mold product.

Further, there has been a problem that the structure of the electric connector box tends to become too complicated, requiring separate components, such as the solderless terminals 103, securing wires 102. Moreover, the solderless terminals 103 need to be fitted into the wire grooves 101a one by one so as to secure the wires 102 to the case 101. For this reason, mounting of the solderless terminals 103 has been troublesome and time-consuming.

SUMMARY OF THE INVENTION

The object of the present invention is to provide a resin mold product of a simple structure, and a wiring method by which wires of various kinds can be easily arranged, and workability can be enhanced by introducing the automation of wiring.

To achieve the above object, the present invention provides a resin mold product which comprises: a main body having a shape compatible with the shape of securing positions of the wires; a plurality of side walls which are situated higher than the wires and face to each other; and wire receiving portions for the wires formed between the side walls. The main body and the side walls are integrally molded using a fusible resin material for forming a space between the side walls to provide the wires receiving portions.

The above object may also be achieved by a wiring method for the above resin mold product. This method comprises the steps of: receiving the wires at the wire receiving portions; and partially melting the side walls to weld and secure the wires to the resin mold product.

With the above resin mold product, no separate components are necessary in securing the wires, and the entire product can be integrally formed by a metal mold,there by greatly simplifying the entire structure of the product.

According to the above wiring method, the side walls of the resin mold product are partially melted to secure the wires. Thus, the wires can be easily attached to the resin mold product for wiring.

The more wire receiving portions the resin mold product has, the more discrete wires can be welded simultaneously by performing a single welding operation.

Thus, the wiring can be automated and workability can be improved.

Furthermore, if the wire receiving portions are made wider, a flat wire harness can also be held, making it possible to accept various kinds of wire.

The object of the present invention can also be achieved by providing a resin mold product which comprises: a main body having a shape compatible with the shape of securing positions of the wires; a plurality of opposed side walls having protrusions which are situated higher than the wires; and wire receiving portions formed between the side walls. The main body and the side walls are integrally molded using a fusible resin material for forming a space between the opposed side walls to provide the wire receiving portions.

The above object of the present invention can also be achieved by providing a resin mold product which comprises: a main body having a shape compatible with the shape of securing positions of the wires; a plurality of opposed side walls; a wire receiving portion formed between the side walls; and protrusions which are situated higher than the wires and integrally molded on the bottom of the wire receiving portion. The main body and the side walls are integrally molded using a fusible resin material.

The above object of the present invention can also be achieved by providing a method which comprises the steps of: receiving the wires at the wire receiving portions; and melting the protrusions to weld and secure the wires to the resin mold product.

With the above resin mold products and the wiring method, the resin material that forms the protrusions can be utilized for welding and securing the wires. Accordingly, the wires can be surely held as long as the protrusions are formed by a sufficient amount of resin material.

The protrusions used for welding are effective especially in holding a wide flat wire harness.

The above object of the present invention can also be achieved by providing a resin mold product, the main body of which is molded into the form of a pillar trim for vehicles, and the side walls and the receiving portions of which are integrally molded on the back of the main body. The same effects can be obtained by providing a resin mold product, the main body of which is molded into the form of a pillar trim for vehicles, and w the side walls and the wire receiving portions of which are integrally molded, together with the protrusions, on the back of the main body.

The object of the present invention can also be achieved by a wiring method which comprises the steps of: receiving wires which have been cut to the length equal to a front pillar for vehicles at the wire receiving portions molded into the form of a pillar trim; partially melting the side walls or melting the protrusions to weld and secure the wires to the resin mold product; mounting the resin mold product to the front pillar; and connecting circuits mounted on the instrument panel and the roof to each other with the wires.

With the above resin mold product and the wiring method, wires having the same length as the front pillar can be formed into the unit with the front pillar by arranging the wires to the front pillar, which is a resin mold product, in advance.

The unit construction of the pillar trim is then mounted to the front pillar, and the wires arranged to the pillar trim are connected to the circuits mounted on the instrument panel and the roof. By doing so, the wiring from the instrument panel to the roof can be efficiently performed.

The above and other objects and features of the present invention will be more apparent from the following description taken in conjunction with the accompanying drawings.

DESCRIPTION OF THE PREFERRED EMBODIMENTS

The following is a description of embodiments of the resin mold product and wiring process according to the present invention, with reference to the accompanying drawings.

Figure 1:
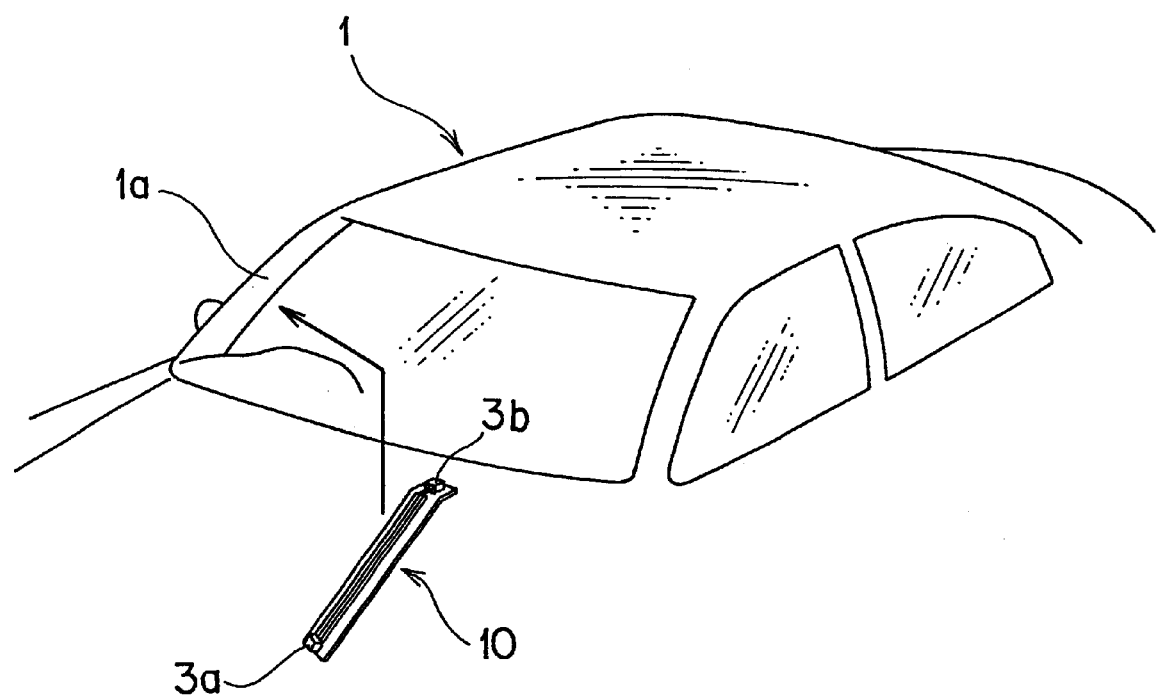
FIG. 1 shows the use of a resin mold product of a first embodiment of the present invention.
Figure 2A:
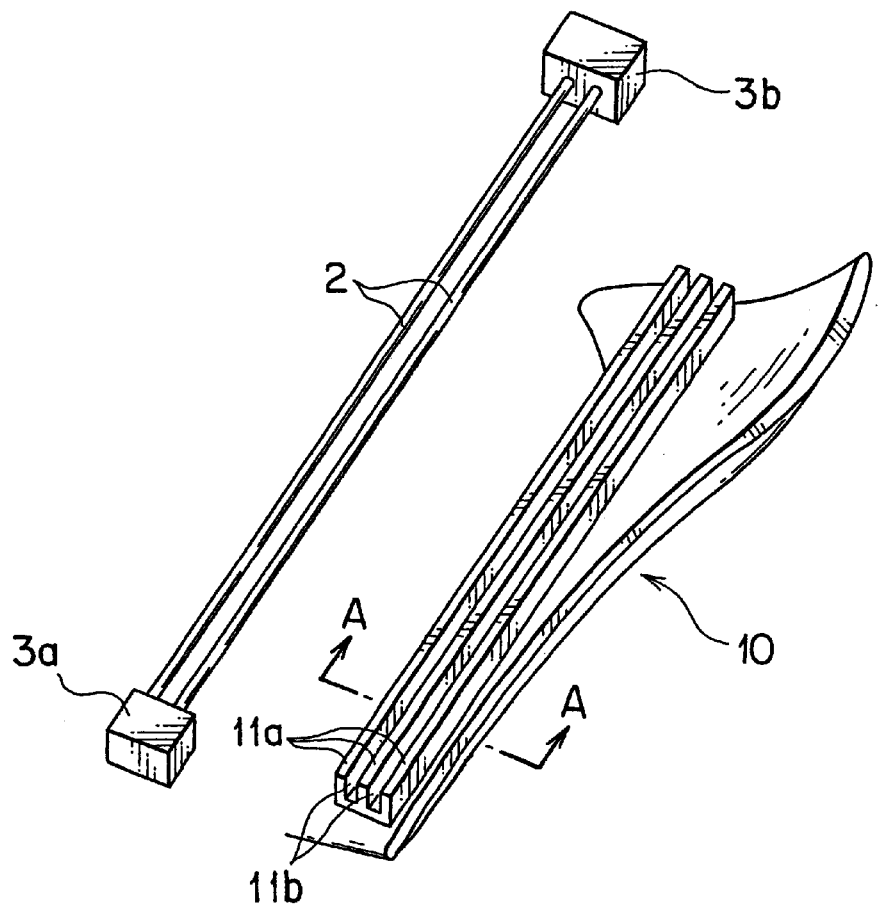
FIG. 2A is a perspective view of the resin mold product of FIG. 1.
Figure 2B:
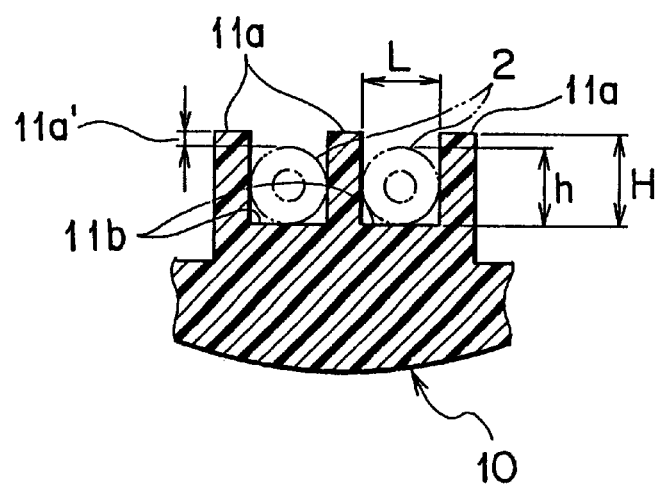
FIG. 2B is a sectional view of the resin mold product taken along the line A–A' of FIG. 2A.

FIG. 1 illustrates how the resin mold product of the first embodiment is put into practical use. FIG. 2A is a perspective view of the resin mold product, and FIG. 2B is a sectional view of the same taken along the line A–A' of FIG. 2A.

The resin mold product of this embodiment takes the form of a pillar trim for vehicles. In this embodiment, wires are attached to the pillar trim, and then the wiring is performed from the instrument panel to the roof of the vehicle, using the unit construction of the pillar trim and wires.

In FIG. 1, reference numeral 10 indicates a pillar trim (resin mold product) made of a fusible resin material. This pillar trim 10 is mounted to a front pillar 1a of a vehicle 1.

On the rear surface of the pillar trim 10, three side walls 11a facing to each other are integrally formed, as shown in FIG. 2A. The spaces formed between the side walls 11a are wire receiving portions 11b for receiving wires 2.

As shown in FIG. 2B, the side walls 11a have the height that is 1.2 times the height h of the wires 2. The excessive portions 11a' of the side walls 11a, which are the portions situated in higher positions than the wires 2, are to be fused by a ultrasonic welding device which will be mentioned later.

The width L of the wire receiving portions 11b is substantially the same as the diameter of the wires 2.

Referring back to FIG. 1 and FIG. 2A, the wires 2 are cut to the same length as the front pillar 1a, and provided with electrical connection boxes 3a and 3b at both ends. After being wired to the pillar trim 10, the wires 2 are connected to circuits mounted on the instrument panel and roof of the vehicle 1 through the electrical connection boxes 3a and 3b.

Figure 3A:
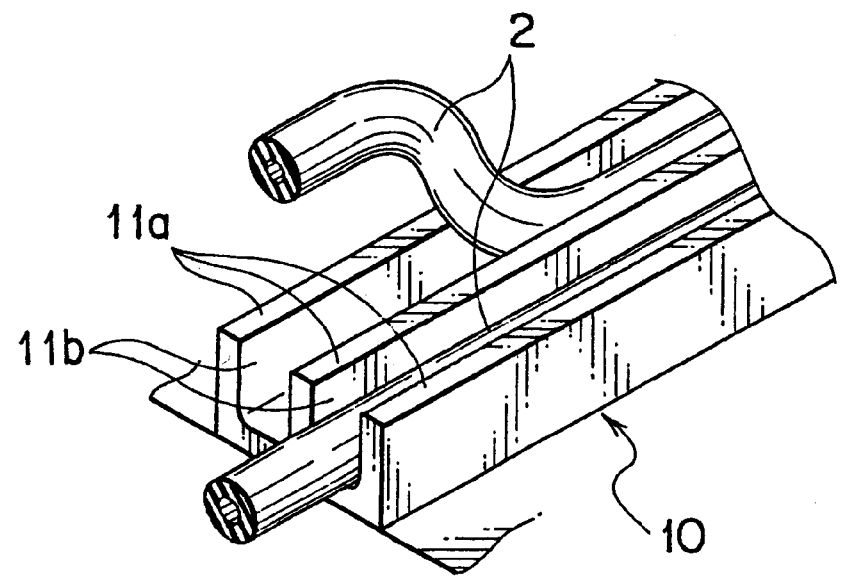
FIGS. 3A and 3B illustrate the wiring process of the first embodiment.
Figure 3B:
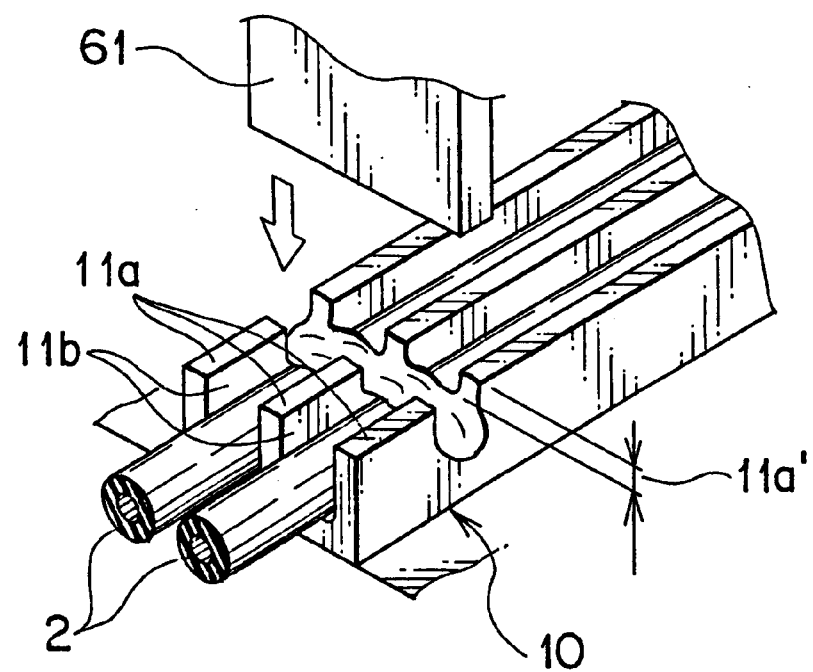

Referring now to FIGS. 3A and 3B, an embodiment of a wiring method using the above pillar trim (resin mold product) 10 will be described.

FIGS. 3A and 3B illustrate the steps of the wiring method of this embodiment.

As shown in FIG. 3A, the wires 2 are received by the receiving portions 11b, respectively, of the pillar trim 10.

As shown in FIG. 3B, the ultrasonic horn 61 of the ultrasonic welding device (not shown) melts the excessive portions 11a' of the side walls 11a along a straight line in a lateral direction, and the wires 2 are welded and secured to the pillar trim 10.

Since the wires 2 are as lengthy as the front pillar 1a, they should be welded at least at three points, i.e., at both ends and the mid point.

By doing so, the wires 2 are welded to the pillar trim 10, thereby uniting the pillar trim 10 with the wires 2.

As shown in FIG. 1, the united pillar trim 10 is welded to the front pillar 1a, and the wires 2 are connected to the circuits mounted on the instrument panel and the roof of the vehicle 1. Thus, the instrument panel can be wired to the roof.

By using the pillar trim 10 (resin mold product) of this embodiment, the wires 2 do not require a member for holding or securing the wires 2. Thus, the entire product can be integrally molded by a metal mold, and the structure can be simplified.

According to the wiring method using the pillar trim 10 of this embodiment, the excessive portions 11a' of the side walls 11a are melted at several points by the ultrasonic welding device, so as to weld and secure the wires 2 to the pillar trim 10.

By welding the wires, 2 of the same length as the front pillar la to the pillar trim 10 (resin mold product), the lengthy wires 2 can be easily welded and secured to the pillar trim 10. By doing so, the pillar trim 10 and the lengthy wires 2 can be united.

Accordingly, by mounting the united pillar trim 10 to the front pillar 1a, and connecting the lengthy wires 2, which have already been welded to the pillar trim 10, to the circuits mounted on the instrument panel and the roof, the wiring of the instrument panel to the roof, which has been difficult in the prior art, can be efficiently performed.

A large number of wire receiving portions 11b enable the resin mold product to hold an equally large number of discrete wires 2. Those wires 2 can be welded simultaneously by performing a welding process only once.

Accordingly, the assembling of the pillar trim 10, the wires 2, and the electric connection boxes 3a and 3b can be automated so as to improve productivity.

Furthermore, if the width L of the wire receiving portions 11b is wider, a flat wire harness can be received to install wires of various kinds. This applies to the resin mold product and the wiring method of the second embodiment described below.

Although the wires 2 are welded and secured to the pillar trim 10 in the first embodiment, they may be connected to the instrument panel or the mold roof if the main body of the resin mold product is shaped accordingly.

The wires 2 are welded and secured by the ultrasonic horn 61 of the ultrasonic welding device (not shown) in the first embodiment, but the wires 2 may be heat-fused by a heat fusion welding device. This also applies to the resin mold products and the wiring methods of the second to fifth embodiments described below.

The following is a description of the resin mold product and the wiring method of the second embodiment of the present invention.

Figure 4:
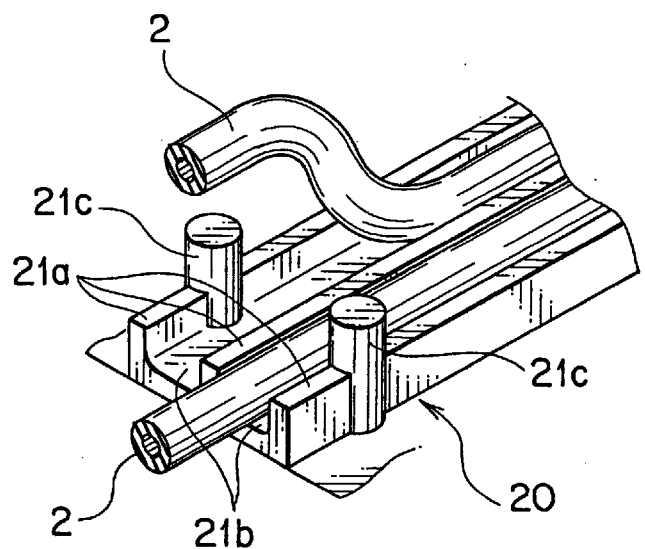
FIG. 4 is a perspective view of a resin mold product of a second embodiment of the present invention.
Figure 5A:
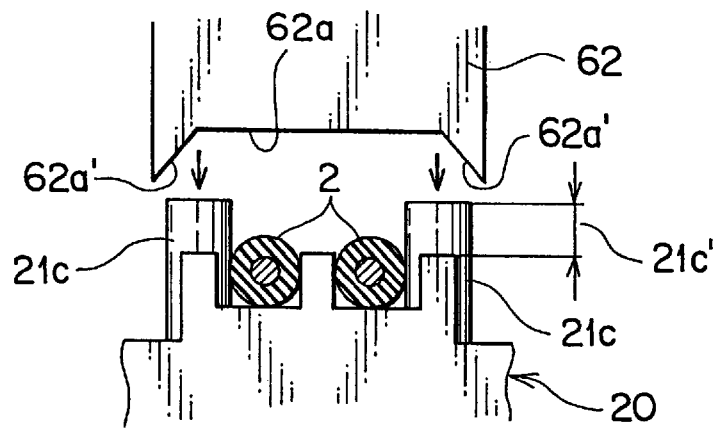
FIGS. 5A and 5B illustrate the wiring process of the second embodiment.
Figure 5B:
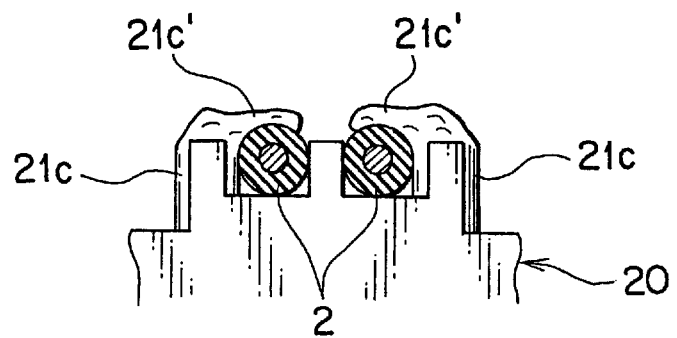

FIG. 4 is a perspective view of the resin mold product of the second embodiment. FIGS. 5A and 5B show the entire wiring method of the second embodiment.

As shown in FIG. 4, the resin mold product 20 of this embodiment has three sidewalls 21a which are situated lower than the wires 2. Among the side walls 21a, two side walls on both ends are provided with cylindrical protrusions 21c which are situated higher than the wires 2.

The main body of the resin mold product 20 has a shape of any part (not shown) that is capable of accommodating the wires 2. This also applies to the third to fifth embodiments described below.

Meanwhile, the wiring method of this embodiment concerns how the wires 2 are welded to the resin mold product 20. In accordance with this method, the wires 2 are received by a receiving portion 21b of the resin mold product 20, and excessive portions 21c' of the protrusions 21c are then melted by a ultrasonic horn 62, as shown in FIG. 5A. Thus, the wires 2 are welded and secured to the resin mold product 20, as shown in FIG. 5B.

The ultrasonic horn 62 of this embodiment has tapered portions 62a' These tapered portions 62' melt and bend excessive portions 21a' of the protrusions 21c toward the wires 2 (i.e., toward the inner side) at the time of welding. By doing so, the wires can be secured to the resin mold product 20.

Since the resin material that forms the protrusions 21c can be used for securing the wires 2, the wires 2 can be more accurately secured if the protrusions 21c are formed by an enough amount of resin material.

The following is an explanation of the resin mold product and the wiring method of the third embodiment of the present invention.

Figure 6A:
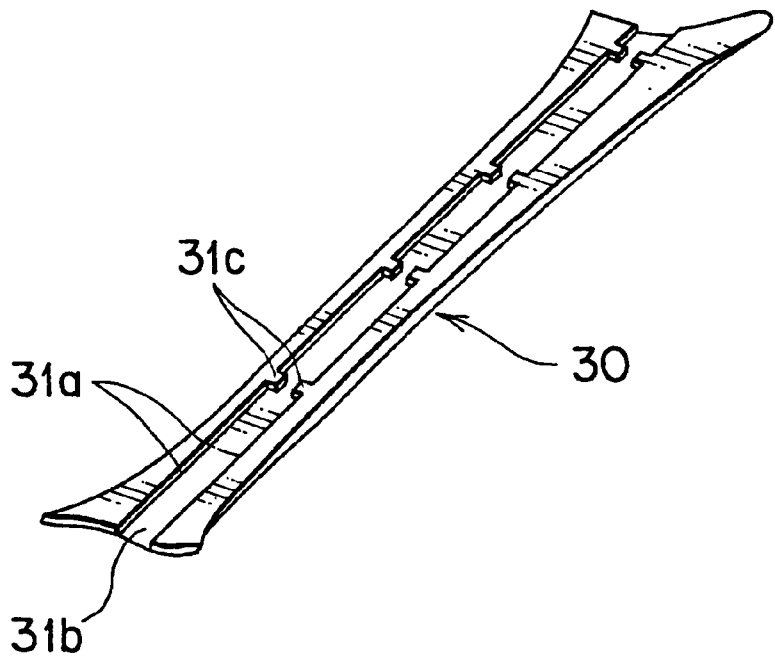
FIG. 6A is a perspective view of a resin mold product of a third embodiment of the present invention.
Figure 6B:
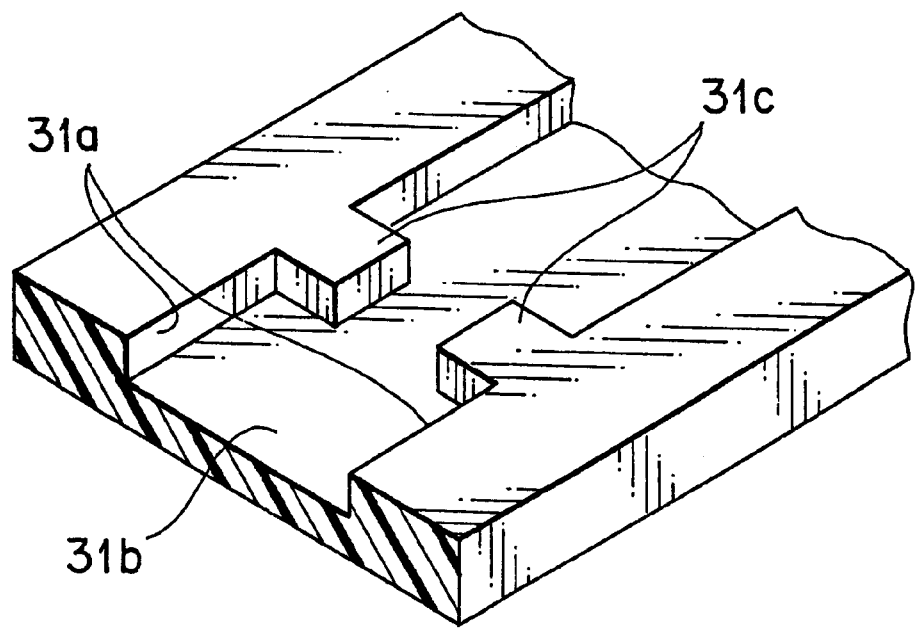
FIG. 6B is a partially enlarged view of the resin mold product of FIG. 6A.

FIG. 6A is a perspective view of the resin mold product of the third embodiment, and FIG. 6B is a partially enlarged view of the same.

Figure 7A:
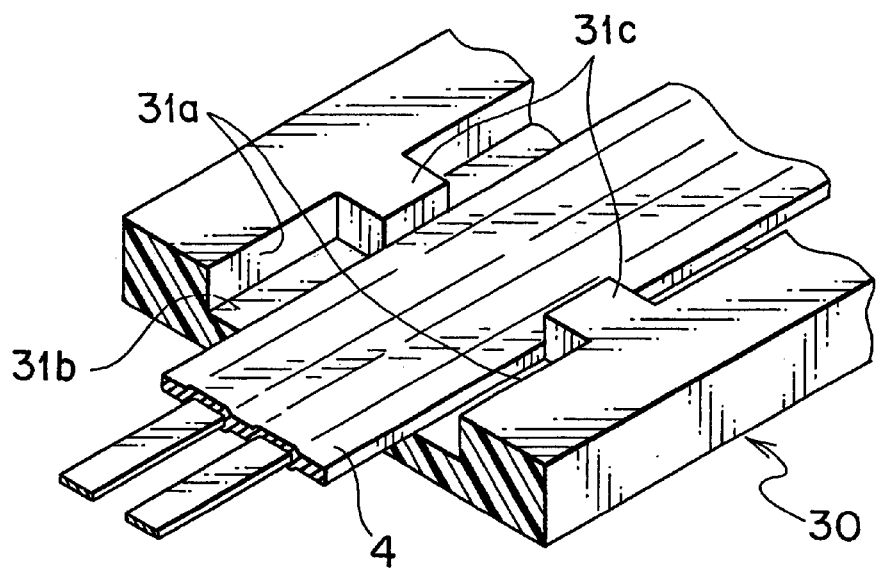
FIGS. 7A and 7B illustrate the wiring process of the third embodiment.
Figure 7B:
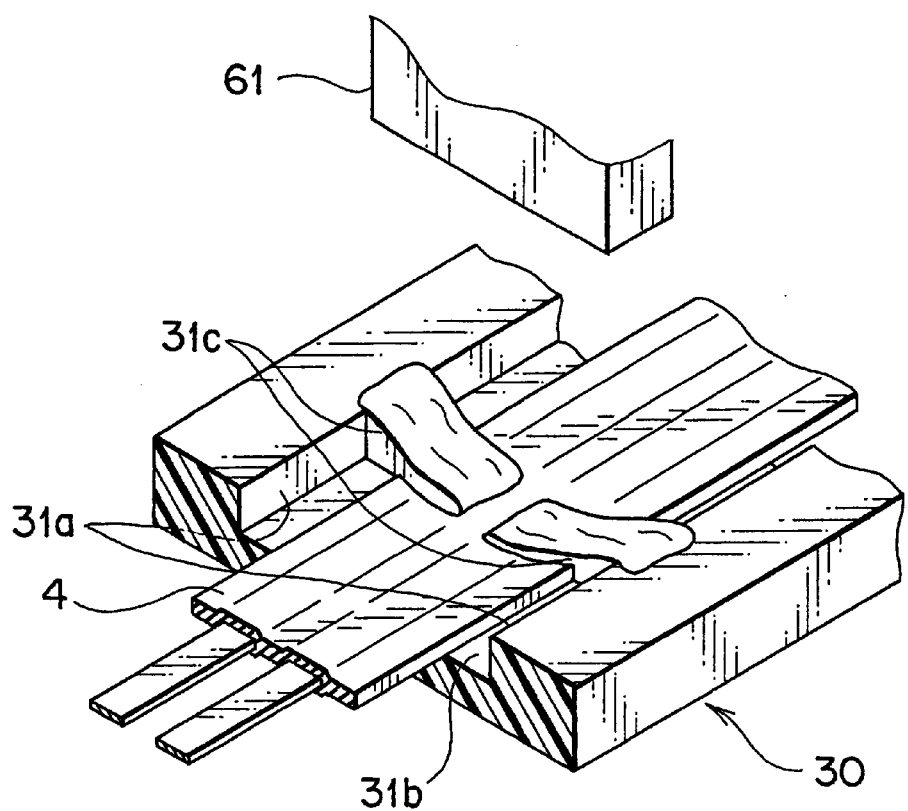
Figure 8A:
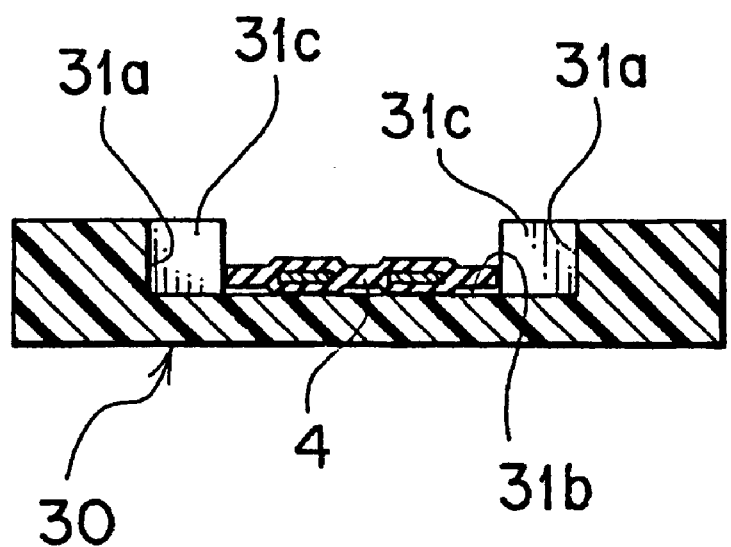
FIGS. 8A and 8B are sectional views corresponding to FIGS. 7A and 7B.
Figure 8B:
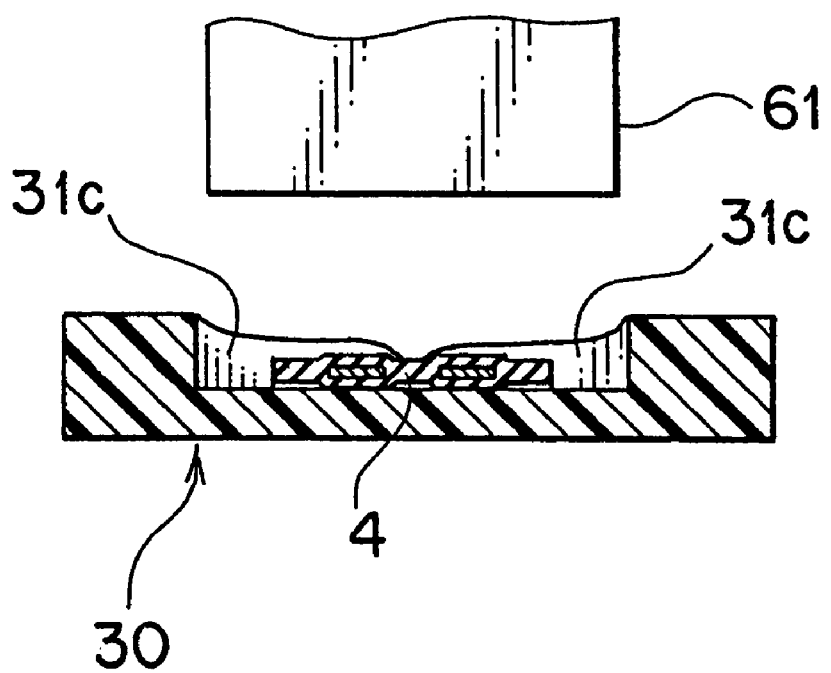

FIGS. 7A and 7B show the wiring method of the third embodiment of the present invention, while FIGS. 8A and 8B are perspective views corresponding to FIGS. 7A and 7B.

In FIGS. 6A and 6B, a resin mold product 30 of this embodiment is provided with two side walls 31a by forming a wide wire receiving portion 31b on its back. Rectangular protrusions 31c facing to each other are integrally formed on the inner faces of the side walls 31a.

In this embodiment, as shown in FIG. 7A, the wires received by the wire receiving portion 31bare a flat wire harness 4which is formed by covering conductors with a flat insulating coating.

According to the wiring method of this embodiment, the flat wire harness 4 is welded and secured to the resin mold product 30. The flat wire harness 4 is received by the wire receiving portion 31b of the resin mold product 30, as shown in FIGS. 7A. and 8A. The protrusions 31c are then melted by the ultrasonic horn 61, and both ends of the flat wire harness 4 are held by the claw-like protrusions 31c that have been welded. Thus, the flat wire harness 4 can be welded to the resin mold product 30.

In this embodiment, the protrusions 31c are situated much higher than the flat wire harness 4, because the flat wire harness 4 takes the place of the wires 2. As a result, more resin can be melted to hold the wide flat wire harness 4 in a stable condition.

In order to form holding claws which have the same shape as the fused claw-like protrusions 31c in advance by using a metal mold, undercut is necessary. In this embodiment, however, undercut is unnecessary, because the protrusions 31c are fused and formed into the shape of claws after the molding of the resin mold product 30 with a metal mold. Thus, the metal mold can be less expensive.

Since the flat wire harness 4 is received by the groove-like wire receiving portion 31b formed on the back of resin mold product 30, no protrusions are formed on the back of the resin mold product 30 after the welding and securing of the flat wire harness 4. Thus, the flat wire harness 4 can be smoothly welded to the predetermined positions of the resin mold product 30.

Accordingly, if the resin mold product 30 of the present invention is used for a pillar trim for vehicles, the welding to a front pillar will be much easier.

Although the flat wire harness 4 is employed in the third embodiment described above, conventional wires 2 (see FIGS. 2A and 2B) may be separately held by forming a plurality of narrow wire receiving portions 31b. This also applies to the resin mold product and the wiring method of the fourth embodiment described below.

The following is an explanation of the resin mold product and the wiring method of the fourth embodiment of the present invention.

Figure 9A:
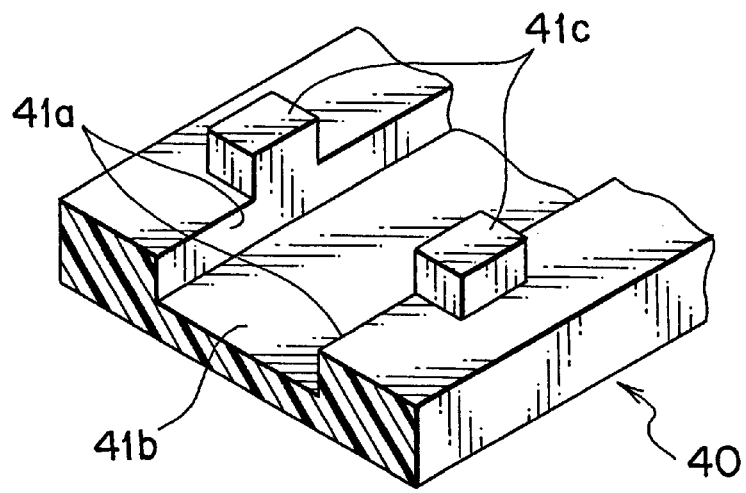
FIGS. 9A and 9B illustrate a resin mold product and the wiring process of a fourth embodiment of the present invention.
Figure 9B:
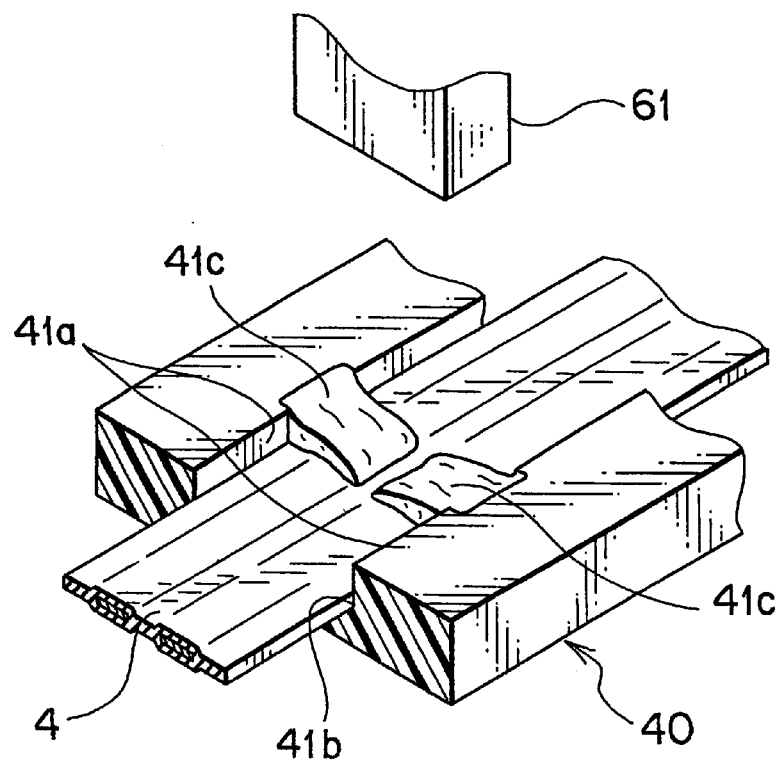

FIGS. 9A and 9B illustrate the resin mold product and the wiring method of the fourth embodiment.

As can be seen from the drawings, the resin mold product 40 of this embodiment is a modification of the resin mold product 30 of the third embodiment. Here, the width of the receiving portion 41b formed on the back of the resin mold product 40 is the same as the width of the flat wire harness 4, and rectangular protrusions 41c are integrally formed on the upper surfaces of the side walls 41a on both sides of the wire receiving portion 41b.

The wiring method of this embodiment concerns how the flat wire harness 4 is welded to the resin mold product. According to this method, the protrusions 41c protrude from the back of the resin mold product 40 before they are fused by the ultrasonic welding horn 61 but the protrusions 41c are formed into claws situated in the wire receiving portion 41b so as to hold the flat wire harness 4, as in the third embodiment.

The resin mold product 40 and the wiring method for the resin mold product 40 of this embodiment has the same effects as the third embodiment. Furthermore, the protrusions 41c are formed on the upper surfaces of the side walls, so that the width of the wire receiving portion 41b can be the same as the flat wire harness 4 to ensure smooth receipt of the flat wire harness 4 by the wire receiving portion 41b.

The following is an explanation of the resin mold product and the wiring method of the fifth embodiment of the present invention.

Figure 10A:
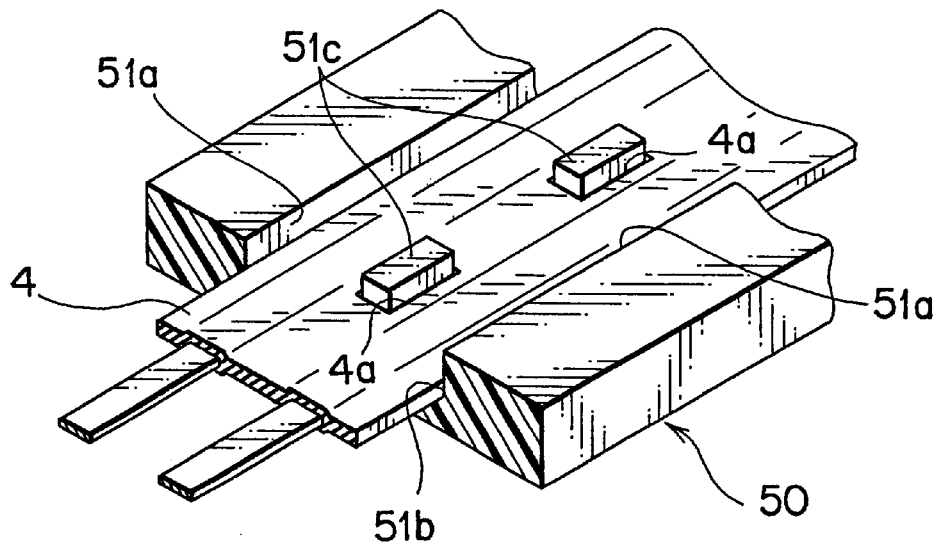
FIGS. 10A and 10B illustrate a resin mold product and the wiring process of a fifth embodiment of the present invention.
Figure 10B:
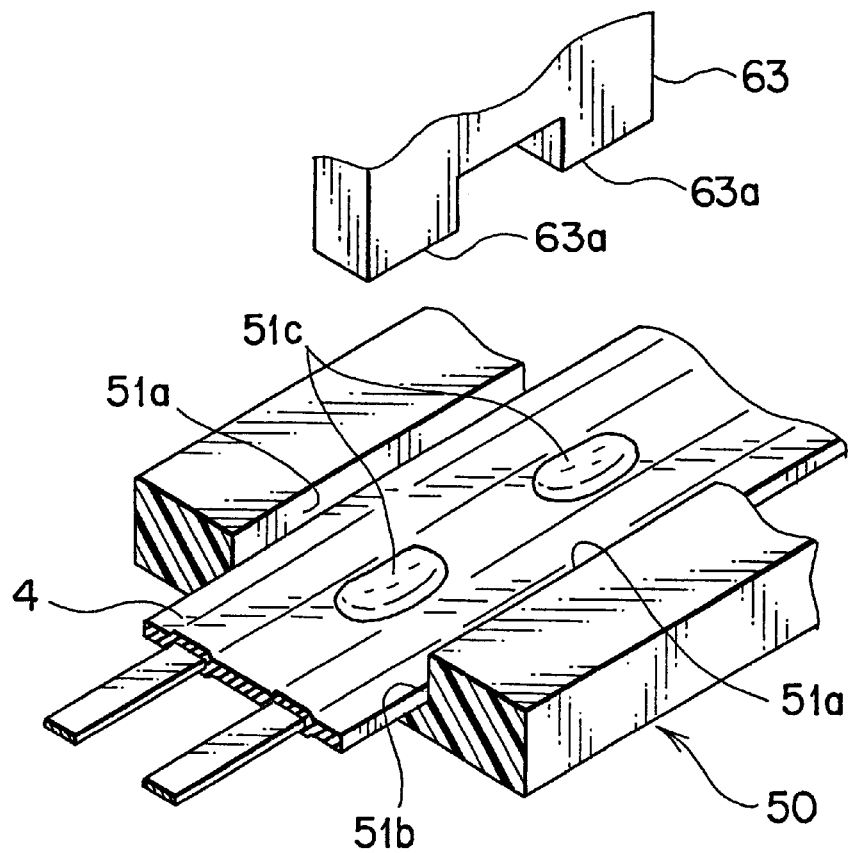
Figure 11A:
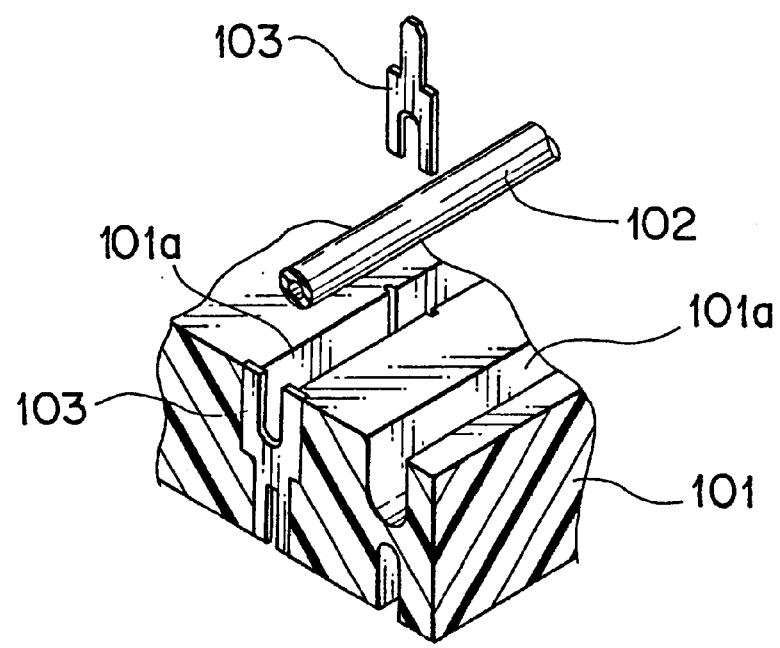
FIG. 11A is a perspective view of an electric connector box of the prior art.
Figure 11B:
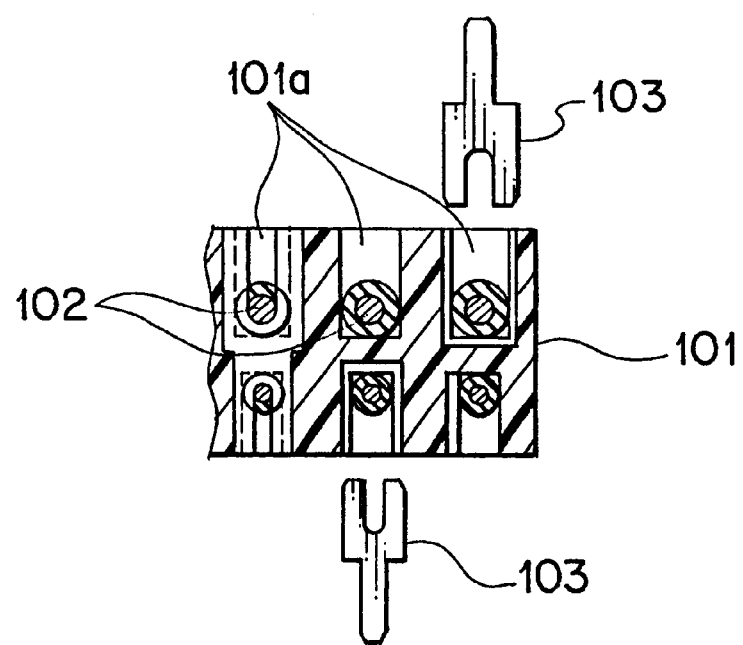
FIG. 11B is a sectional view of the electric connector box of the prior art.

FIGS. 10A and 10B illustrate the resin mold product and the wiring method of the fifth embodiment.

As can be seen from FIGS. 10A and 10B, the resin mold product 50 of this embodiment is provided with two side walls 51a on the back so as to form a wire receiving portion 51b at the same time, and rectangular protrusions 51c are integrally formed at intervals in the middle of the bottom surface of the wire receiving portion 51b.

The width of the wire receiving portion 51b is the same as the width of the flat wire harness 4 to be received by the wire receiving portion 51b.

Rectangular holes 4a corresponding to the shapes of the protrusions 51c are formed in the middle of the flat wire harness 4.

Here, the ultrasonic welding horn 63 of this embodiment is cut at the middle to form two welding surfaces 63a corresponding to the protrusions 51c.

Meanwhile, the wiring method of this embodiment concerns how the flat wire harness 4 is attached to the resin mold product 50. According to this method, the flat wire harness 4 is received by the receiving portion 51b of the resin mold product 50, so that the protrusions 51c can penetrate through the holes 4a. The protrusions 51c are then fused by the welding surfaces 63a of the ultrasonic horn 63 situated in parallel with the receiving portion 51b, so as to weld the flat wire harness 4 to the resin mold product 50. Thus, the flat wire harness 4 can be secured to the resin mold product 50.

According to this embodiment, the width of the receiving portion 51b can be made the same as the width of the flat wire harness 4, so that the flat wire harness 4 can be smoothly received by the receiving portion 51b, as in the fourth embodiment.

Since the protrusions 51c situated in the mid section of the wide wire receiving portion 51b is melted by the ultrasonic welding horn 63 arranged in parallel with the receiving portion 51b, the welding surfaces 63a of the ultrasonic horn 63 smoothly correspond to the protrusions 51c, making the welding and securing of the flat wire harness 4 easier.

Furthermore, since the welding is performed in the middle of the flat wire harness 4 through the holes 4a, it is possible to maintain a stable holding power and to perform the most efficient welding even if the amount of resin is small.

For the resin mold product 50 and the wiring method of this embodiment, not only a flat wire harness is used, but also a large number of discrete wires 2 as shown in FIG. 2 are bundled so as to form flat bundles of wires which can be welded to the rein mold product 50.

In such case, the protrusions 51c are inserted into the gaps between the wires to eliminate the necessity of cutting holes 4a in the flat wire harness 4.

As described so far, by employing the resin mold product of the present invention, the entire product can be integrally molded without a separate member for holding wires. Thus, the structure of the product can be made very simple.

According to the wiring method of the present invention, wires can be readily held by partially melting the side walls of a resin mold product, thereby easily welding and securing the wires to the resin mold product.

The larger the number of wire receiving portions is, the more discrete wires can be welded and secured. Those wires can be welded and secured by performing the welding process only once.

By doing so, the wiring can be automated, and the workability can be enhanced.

If the width of the receiving portion(s) is greater, a flat wire harness can be held, making it possible to hold wires of various kinds.

If the resin mold product of the present invention can be used for a pillar trim, and the wiring method of the present invention is applied in wiring from the instrument panel to the roof, the pillar trim and the long wires can be united by welding in advance the wires having a length equal to the length of the front pillar to the pillar trim, which is the resin mold product.

The pillar trim united with the wires is then mounted to the front pillar, and the long wires welded and secured to the pillar trim are connected to the circuits mounted on the instrument panel and the roof. Thus, the wiring from the instrument panel to the roof, which has been considered difficult, can be efficiently performed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A wiring method for a resin mold product, comprising the steps of:

providing a resin mold product having side walls facing each other;

receiving wires at wire receiving portions formed between said side walls, said side walls having discrete protrusions which protrude from said side walls and are situated higher than said wires; and melting said discrete protrusions towards said wires to weld and secure said wires to the resin mold product.

2. A wiring method according to claim 1, wherein said resin mold product is a pillar trim mounted to a front pillar, and said wires have the same length as the front pillar, and said wires connect circuits mounted on an instrument panel and roof.

3. A wiring method according to claim 1, wherein said protrusions are formed on a bottom surface of said wire receiving portion.

4. A wiring method according to claim 3, wherein said resin mold product is a pillar trim mounted to a front pillar, and said wires have the same length as the front pillar, and said wires connect circuits mounted on an instrument panel and roof.

* * * * *